(12) United States Patent
Hirai

(10) Patent No.: US 9,317,901 B2
(45) Date of Patent: Apr. 19, 2016

(54) IMAGE PROCESSING APPARATUS AND IMAGE PROCESSING METHOD FOR NOISE FILTERING

(71) Applicant: CANON KABUSHIKI KAISHI, Tokyo (JP)

(72) Inventor: Shinya Hirai, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 15 days.

(21) Appl. No.: 14/103,070

(22) Filed: Dec. 11, 2013

(65) Prior Publication Data

US 2014/0168473 A1   Jun. 19, 2014

(30) Foreign Application Priority Data

Dec. 17, 2012 (JP) ................................ 2012-275096

(51) Int. Cl.
| | |
|---|---|
| G06K 9/34 | (2006.01) |
| G06T 5/00 | (2006.01) |
| H04N 9/64 | (2006.01) |
| H04N 9/77 | (2006.01) |

(52) U.S. Cl.
CPC ................ *G06T 5/002* (2013.01); *H04N 9/646* (2013.01); *H04N 9/77* (2013.01); *G06T 2207/20016* (2013.01)

(58) Field of Classification Search
None
See application file for complete search history.

(56) References Cited

U.S. PATENT DOCUMENTS

| 8,797,462 | B2 * | 8/2014 | Hirai | ............................. | 348/624 |
| 2004/0071363 | A1 * | 4/2004 | Kouri et al. | .................... | 382/276 |
| 2006/0101080 | A1 * | 5/2006 | Atsumi et al. | ................ | 707/200 |
| 2006/0114479 | A1 * | 6/2006 | John | ............................... | 358/1.2 |
| 2008/0122953 | A1 * | 5/2008 | Wakahara et al. | ............ | 348/241 |
| 2008/0303951 | A1 * | 12/2008 | Nakayama | ..................... | 348/607 |
| 2011/0199542 | A1 * | 8/2011 | Hirai | ............................. | 348/624 |

FOREIGN PATENT DOCUMENTS

| CN | 101087367 A | 12/2007 |
| CN | 101321235 A | 12/2008 |
| CN | 101651774 A | 2/2010 |
| CN | 102754443 A | 10/2012 |
| JP | 2006-050109 A | 2/2006 |
| JP | 2008-293425 A | 12/2008 |
| JP | 2009-199104 A | 9/2009 |

OTHER PUBLICATIONS

The above patent documents in this IDS were cited in a May 27, 2015 Chinese Office Action, that issued in Chinese Patent Application No. 201310693277.2.

* cited by examiner

*Primary Examiner* — Andrae S Allison
(74) *Attorney, Agent, or Firm* — Cowan, Liebowitz & Latman, P.C.

(57) ABSTRACT

An input image is divided into images composed of luminance signals of a plurality of bands that make up the Laplacian pyramid, noise suppression is applied to each divided image, and then the divided images are composited by addition. The input image is also divided into images composed of color signals of a plurality of bands that make up the Gaussian pyramid, noise suppression is applied to each divided image, and the divided images are composited at an image-based ratio. By thus compositing the luminance signals and color signals, excellent noise suppression can be realized while alleviating deterioration in the image quality during the compositing.

8 Claims, 6 Drawing Sheets

BANDS IN EACH LAYER OF LAPLACIAN PYRAMID (THREE LAYERS)

BANDS IN EACH LAYER OF GAUSSIAN PYRAMID (THREE LAYERS)

IMAGE PROCESSING APPARATUS AND IMAGE PROCESSING METHOD FOR NOISE FILTERING

BACKGROUND OF THE INVENTION

1. Field of the Invention

The present invention relates to an image processing apparatus and an image processing method, and in particular to an image processing apparatus and an image processing method that can suppress noise in images.

2. Description of the Related Art

In recent years, image signals obtained from an image sensor contain more noise components due to a decrease in the size of pixels. A method is known for suppressing noise components contained in image signals by using multi-rate signal processing.

Japanese Patent Laid-Open No. 2008-293425 discloses a method in which image signals are separated into a plurality of frequency components using techniques such as the wavelet transform and the Laplacian pyramid, noise is suppressed for each frequency component, and then the frequency components are recomposited. For example, when the Laplacian pyramid is used, a low-band image is obtained by applying reduction processing to the original image, and a high-band image is obtained from a difference between an image obtained by enlarging the low-band image and the original image. By repeating reduction processing for a low-band image and generation of a high-band image from a difference from the original image, image signals are separated into frequency components layer-by-layer.

Frequency bands obtained in different layers are indicated by shaded areas in FIG. 6A; in this case, it is considered that there is no overlapping of bands. After noise is suppressed in each of these plurality of images containing frequency bands without any substantial overlapping, the images are recomposited. Recompositing can be realized by repeating compositing processing in which a reduced image is enlarged and added to a differential image in the next layer up.

As described above, processing for an image that was separated with no overlapping of frequency bands has the feature that, as recompositing processing is simple, compositing unevenness caused by recompositing is small. On the other hand, as all of the separated images are composited, noise that remains in the band-separated images even after noise suppression remains in the recomposited image. In particular, if high-frequency color noise, which is visually unpleasant, remains in the recomposited image, the color noise causes deterioration in the image quality of the recomposited image.

On the other hand, as disclosed in Japanese Patent Laid-Open No. 2009-199104, a method is known for applying frequency separation to an image such that frequency bands overlap. For example, when the Gaussian pyramid is used, a plurality of reduced images with different reduction ratios are generated from the original image. Frequency bands in the reduced images are indicated by shaded areas in FIG. 6B; in this case, the images partially overlap in terms of bands. Furthermore, when the Gaussian pyramid is used, every reduced image contains DC components. A recomposited image is obtained by applying noise suppression processing to each reduced image and compositing the reduced images using a compositing ratio calculated based on extracted edge signals.

The method disclosed in Japanese Patent Laid-Open No. 2009-199104 has the problem that a reduction in the detection accuracy for edge signals leads to the occurrence of compositing unevenness in edge portions of the recomposited image. On the other hand, this method has the advantage that, by adjusting the compositing ratio, the amount of noise can be controlled relatively easily; for example, high-band color noise and the like can be effectively reduced by using a large number of low-band images for flat image sections.

As described above, according to the method in which an image is separated into a plurality of bands with no overlapping by using the Laplacian pyramid and the like, noise is suppressed in each separated image, and then the separated images are recomposited, compositing unevenness does not easily occur as the compositing ratio is not calculated, but the noise suppression effect is difficult to improve because images of all bands are recomposited. On the other hand, according to the method in which an input image is separated into a plurality of images with overlapping frequency bands by using the Gaussian pyramid and the like, noise is suppressed in each separated image, and the separated images are composited in accordance with a compositing ratio calculated using edge signals and the like, the amount of noise can be controlled, but the accuracy of the compositing ratio influences the image quality.

SUMMARY OF THE INVENTION

The present invention has been made in view of the above problems in conventional techniques. According to the present invention, in an image processing apparatus and an image processing method that reduce noise by separating an image into a plurality of frequency bands and recompositing the plurality of frequency bands, excellent noise suppression can be realized while alleviating deterioration in the image quality during the compositing.

According to one aspect of the present invention, there is provided an image processing apparatus comprising: a first division circuit that divides an input image into images composed of luminance signals of a plurality of bands that make up a Laplacian pyramid; a plurality of luminance noise suppression circuits that each apply noise suppression to, out of the images divided by the first division circuit, an image composed of luminance signals of a corresponding band; an addition circuit that adds images output from the plurality of luminance noise suppression circuits; a second division circuit that divides the input image into images composed of color signals of a plurality of bands that make up a Gaussian pyramid; a plurality of color noise suppression circuits that each apply noise suppression to, out of the images divided by the second division circuit, an image composed of color signals of a corresponding band; and a compositing circuit that composites images output from the plurality of color noise suppression circuits at a ratio based on the images.

According to another aspect of the present invention, there is provided an image processing apparatus comprising: a reduction circuit that generates a second image and a third image by reducing an input image at a plurality of reduction ratios; a memory that stores the input image, the second image, and the third image; a first luminance signal generation circuit that generates first luminance signals from the input image read from the memory; a first color signal generation circuit that generates first color signals from the input image read from the memory; a first luminance noise suppression circuit that applies noise suppression processing to the first luminance signals; a first color noise suppression circuit that applies noise suppression processing to the first color signals; a second luminance signal generation circuit that generates, from the second image read from the memory, second luminance signals that do not overlap with the first luminance signals in terms of bands; a second color signal generation circuit that generates, from the second image read from the memory, second color signals that partially overlap with the first color signals in terms of bands; a second luminance noise suppression circuit that applies noise suppression processing to the second luminance signals; a second color noise suppression circuit that applies noise suppression processing to the second color signals; a third luminance signal generation circuit that generates, from the third image read from the memory, third luminance signals that do not overlap with the first luminance signals and the second luminance signals in terms of bands; a third color signal generation circuit that generates, from the third image read from the memory, third color signals that partially overlap with the first color signals and the second color signals in terms of bands; a third luminance noise suppression circuit that applies noise suppression processing to the third luminance signals; a third color noise suppression circuit that applies noise suppression processing to the third color signals; an addition circuit that adds the first luminance signals to which the first luminance noise suppression circuit has applied noise suppression processing, the second luminance signals to which the second luminance noise suppression circuit has applied noise suppression processing, and the third luminance signals to which the third luminance noise suppression circuit has applied noise suppression processing; and a compositing circuit that composites the first color signals to which the first color noise suppression circuit has applied noise suppression processing, the second color signals to which the second color noise suppression circuit has applied noise suppression processing, and the third color signals to which the third color noise suppression circuit has applied noise suppression processing, the compositing being performed at a compositing ratio calculated based on at least the first color signals to which the first color noise suppression circuit has applied noise suppression processing.

According to still another aspect of the present invention, there is provided an image processing apparatus comprising: a processor; and a memory coupled to the processor, the memory having instructions that, when executed by the processor, perform operations comprising: first division processing for dividing an input image into images composed of luminance signals of a plurality of bands that make up a Laplacian pyramid; luminance noise suppression processing for applying noise suppression to each of the images divided in the first division processing; addition processing for adding images to which the luminance noise suppression processing has been applied; second division processing for dividing the input image into images composed of color signals of a plurality of bands that make up a Gaussian pyramid; color noise suppression processing for applying noise suppression to each of the images divided in the second division processing; and compositing processing for compositing images to which the color noise suppression processing has been applied at a ratio based on the images.

According to yet another aspect of the present invention, there is provided an image processing apparatus comprising: a processor; and a memory coupled to the processor, the memory having instructions that, when executed by the processor, perform operations comprising: reduction processing for generating a second image and a third image by reducing an input image at a plurality of reduction ratios; processing for storing the input image, the second image, and the third image in a memory; first luminance signal generation processing for generating first luminance signals from the input image read from the memory; first color signal generation processing for generating first color signals from the input image read from the memory; first luminance noise suppression processing for applying noise suppression processing to the first luminance signals; first color noise suppression processing for applying noise suppression processing to the first color signals; second luminance signal generation processing for generating, from the second image read from the memory, second luminance signals that do not overlap with the first luminance signals in terms of bands; second color signal generation processing for generating, from the second image read from the memory, second color signals that partially overlap with the first color signals in terms of bands; second luminance noise suppression processing for applying noise suppression processing to the second luminance signals; second color noise suppression processing for applying noise suppression processing to the second color signals; third luminance signal generation processing for generating, from the third image read from the memory, third luminance signals that do not overlap with the first luminance signals and the second luminance signals in terms of bands; third color signal generation processing for generating, from the third image read from the memory, third color signals that partially overlap with the first color signals and the second color signals in terms of bands; third luminance noise suppression processing for applying noise suppression processing to the third luminance signals; third color noise suppression processing for applying noise suppression processing to the third color signals; addition processing for adding the first luminance signals to which noise suppression processing has been applied in the first luminance noise suppression processing, the second luminance signals to which noise suppression processing has been applied in the second luminance noise suppression processing, and the third luminance signals to which noise suppression processing has been applied in the third luminance noise suppression processing; and compositing processing for compositing the first color signals to which noise suppression processing has been applied in the first color noise suppression processing, the second color signals to which noise suppression processing has been applied in the second color noise suppression processing, and the third color signals to which noise suppression processing has been applied in the third color noise suppression processing, the compositing being performed at a compositing ratio calculated based on at least the first color signals to which noise suppression processing has been applied in the first color noise suppression processing.

According to still yet another aspect of the present invention, there is provided an image processing method comprising: a first division step of dividing an input image into images composed of luminance signals of a plurality of bands that make up a Laplacian pyramid; a luminance noise suppression step of applying noise suppression to each of the images divided in the first division step; an addition step of adding images obtained in the luminance noise suppression step; a second division step of dividing the input image into images composed of color signals of a plurality of bands that make up a Gaussian pyramid; a color noise suppression step of applying noise suppression to each of the images divided in the second division step; and a compositing step of composing images obtained in the color noise suppression step at a ratio based on the images.

According to yet still another aspect of the present invention, there is provided an image processing method comprising: a reduction step of generating a second image and a third image by reducing an input image at a plurality of reduction ratios; a step of storing the input image, the second image, and the third image in a memory; a step of generating first luminance signals from the input image stored in the memory; a step of generating first color signals from the input image stored in the memory; a first luminance noise suppression step of applying noise suppression processing to the first luminance signals; a step of applying noise suppression processing to the first color signals; a step of generating, from the second image stored in the memory, second luminance signals that do not overlap with the first luminance signals in terms of bands; a step of generating, from the second image stored in the memory, second color signals that partially overlap with the first color signals in terms of bands; a step of applying noise suppression processing to the second luminance signals; a step of applying noise suppression processing to the second color signals; a step of generating, from the third image stored in the memory, third luminance signals that do not overlap with the first luminance signals and the second luminance signals in terms of bands; a step of generating, from the third image stored in the memory, third color signals that partially overlap with the first color signals and the second color signals in terms of bands; a step of applying noise suppression processing to the third luminance signals; a step of applying noise suppression processing to the third color signals; an addition step of adding the first luminance signals to which noise suppression processing has been applied, the second luminance signals to which noise suppression processing has been applied, and the third luminance signals to which noise suppression processing has been applied; and a compositing step of compositing the first color signals to which noise suppression processing has been applied, the second color signals to which noise suppression processing has been applied, and the third color signals to which noise suppression processing has been applied, the compositing being performed at a compositing ratio calculated based on at least the first color signals to which noise suppression processing has been applied.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings.

First Embodiment

Figure 1:
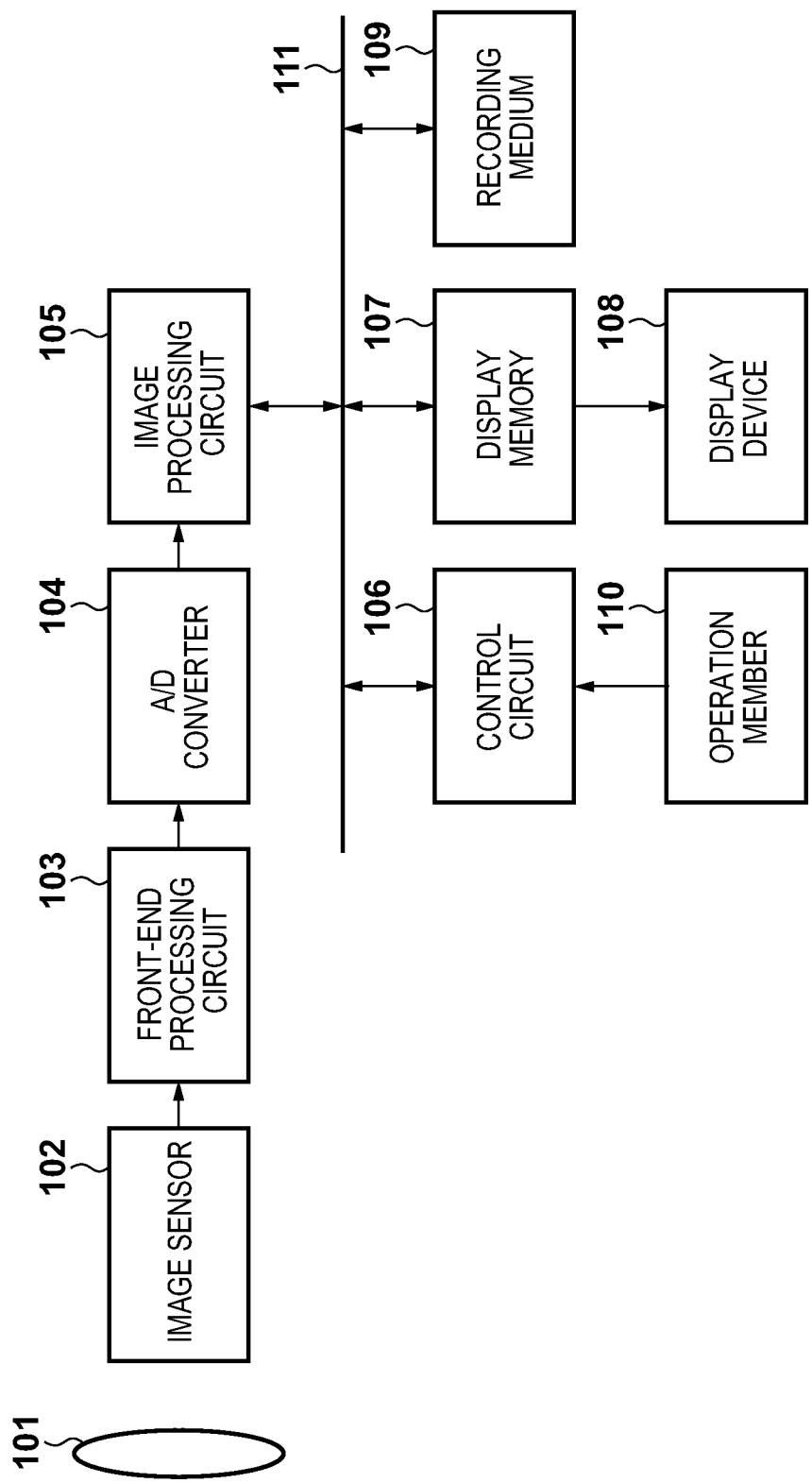
FIG. 1 is a block diagram showing an example of a functional configuration of a digital camera, which is one example of application of an image processing apparatus according to embodiments of the present invention.

FIG. 1 is a block diagram showing an example of a functional configuration of a digital camera, which is one example of application of an image processing apparatus according to embodiments of the present invention. It should be noted that the image processing apparatus of the present invention is not limited to being applied to a digital camera, and may also be applied to a digital video camera, a computer (notebook, desktop, tablet, etc.), and any other electronic devices capable of executing image processing. Examples of such electronic devices include mobile information terminals (PDA), telephones, game consoles, media players, navigation systems, appliances, and vehicles.

Referring to FIG. 1, an optical system 101, which is illustrated as one lens for convenience, includes a lens group composed of a zoom lens and a focus lens, a diaphragm, and a shutter. This optical system 101 adjusts a scale factor for an image of a subject formed on an imaging surface of an image sensor 102, a point of focus, the amount of light, and the like. The image sensor 102 is a photoelectric conversion device, such as a CCD (charge-coupled device) sensor and a CMOS (complementary metal-oxide-semiconductor) sensor. The image sensor 102 generates image signals by converting an image of a subject formed on the imaging surface into electrical signals. In the present embodiment, the image sensor 102 is made up of a CCD.

A front-end processing circuit 103 includes a CDS (correlated double sampling) circuit and an amplifier circuit. The CDS circuit suppresses a dark current contained in the image signals generated by the image sensor 102, and the amplifier circuit amplifies the image signals output from the CDS circuit. An A/D converter 104 converts the image signals output from the front-end processing circuit 103 into digital image signals.

An image processing circuit 105 applies white balance processing, noise suppression processing, gradation conversion processing, edge enhancement correction processing, and the like to the image signals, and outputs the resultant image signals as luminance signals Y and color difference signals U, V. The image processing circuit 105 also calculates, from the image signals, a luminance value of the subject and a focus value indicating a focused state of the subject. The image processing circuit 105 can apply similar image processing to image signals read from a recording medium 109 in addition to the image signals output from the A/D converter 104.

A control circuit 106 includes, for example, a programmable processor such as a CPU and an MPU, and integrally controls the operations of the digital camera by controlling the components that make up the digital camera through deployment of programs stored in a ROM to a RAM and through execution of the deployed programs. The control circuit 106 also controls driving of the optical system 101 and the image sensor 102 based on the luminance value and the focus value of the subject obtained in the image processing circuit 105, and on instructions input from an operation member 110.

A display memory 107 temporarily stores image signals based on which images are to be displayed on a display device 108. The display device 108 is made up of a liquid crystal display or an organic EL (electro luminescence) display, and displays images using the image signals generated by the image sensor 102 and the image signals read from the recording medium 109. Successive image signals read from the image sensor 102 are updated as needed and displayed on the display device 108; in this way, the display device 108 functions as an electronic viewfinder. Furthermore, the display device 108 can display the following items in addition to images: character information, such as a state of the digital camera, and a shutter speed, a diaphragm value or sensitivity information that have been selected by a user or determined by the camera; and a graph showing the luminance distribution measured by the image processing circuit 105.

The recording medium 109 is used to, for example, record image data. The recording medium 109 may be configured in a manner attachable to and detachable from the digital camera, or may be built in the digital camera. Reading and writing of data from and to the recording medium 109 are controlled by, for example, the control circuit 106.

The operation member 110 is operated by the user to issue instructions to the digital camera, and includes input devices such as switches and buttons. Instructions are not limited to being input via operations on the switches and buttons, and may be input using voice recognition and the like. The image processing circuit 105, control circuit 106, display memory 107, and recording medium 109 are connected through a bus 111 in such a manner that they can communicate with one another.

A description is now given of exemplary operations executed by the digital camera according to the present embodiment at the time of image capture.

When an instruction to start preparation for image capture is transmitted through a user operation on the operation member 110, the control circuit 106 starts controlling the operations of various circuits. This instruction is, for example, the act of pressing a shutter button halfway down.

The image sensor 102 generates analog image signals by applying photoelectric conversion to an image of a subject transmitted through the optical system 101, and the A/D converter 104 digitalizes the analog image signals processed by the front-end processing circuit 103. The image processing circuit 105 applies white balance processing, noise suppression processing, gradation conversion processing, edge correction processing, and the like to the image signals output from the A/D converter 104.

The image signals processed by the image processing circuit 105 are displayed as images on the display device 108 via the display memory 107. As described above, image signals are successively generated by the image sensor 102, and the display device 108 updates and displays images of the subject in real time by using the successive image signals that have been read; in this way, the display device 108 functions as an electronic viewfinder.

The above processing is repeated until the execution of an operation for instructing the operation member 110 to start image capture (for example, the act of pressing the shutter button all the way down). Once the instruction to start the image capture has been input, the control circuit 106 readjusts the operations of the optical system 101 based on the luminance value and the focus value obtained through the image processing circuit 105, and then captures a still image. The image processing circuit 105 applies various types of image processing, including the later-described noise suppression processing, to image signals of this still image. The control circuit 106 then records the image signals output from the image processing circuit 105 in the recording medium 109.

Figure 2:
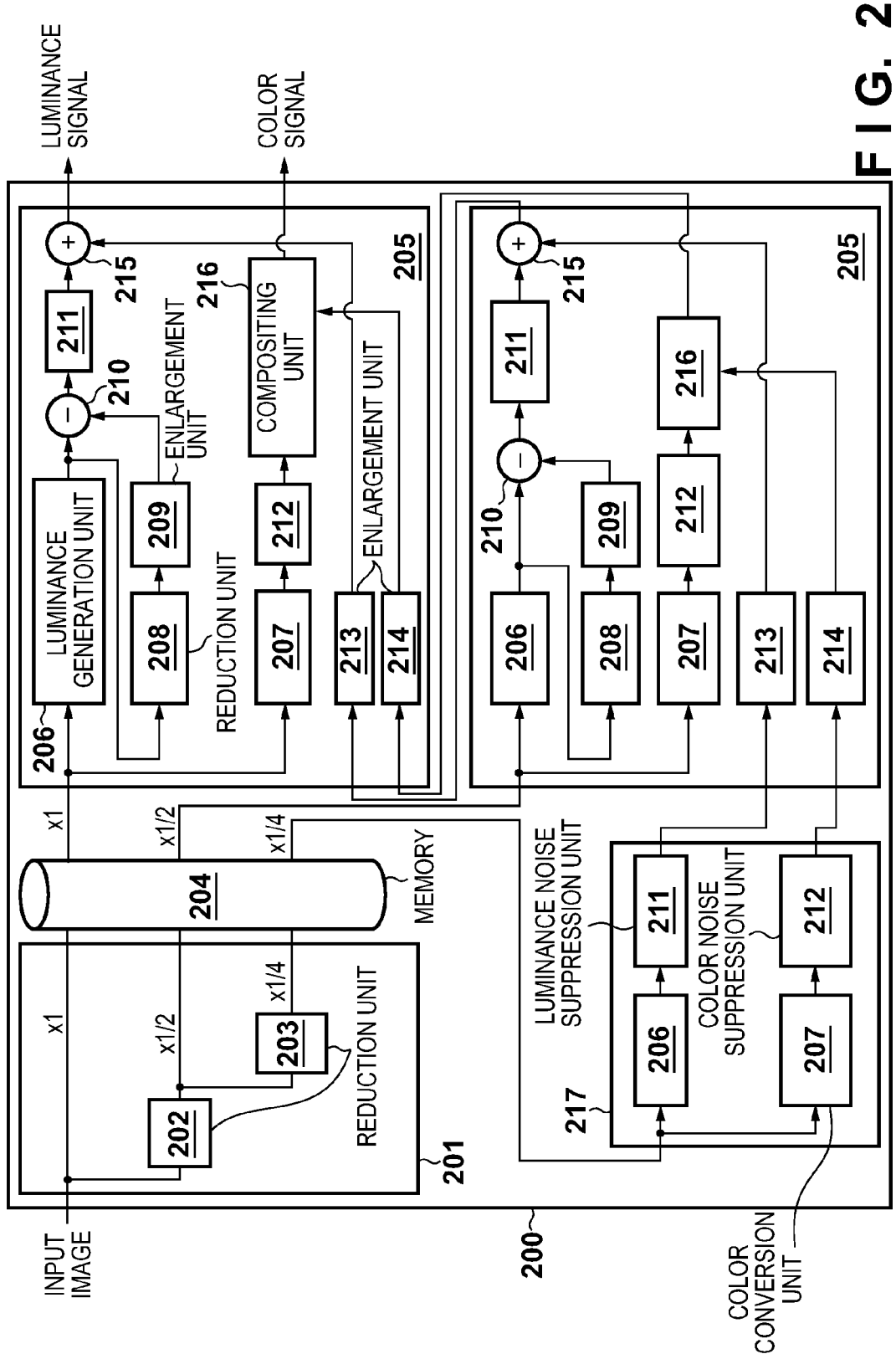
FIG. 2 is a block diagram showing an example of a configuration of an image processing circuit 105 according to a first embodiment of the present invention.

Specifics of the noise suppression processing executed by the image processing circuit 105 will now be described. FIG. 2 is a block diagram showing an example of a functional configuration of a noise suppression unit 200 included in the image processing circuit 105. Note that the noise suppression unit 200 may be realized by software, hardware, or a combination thereof.

In the present embodiment, the noise suppression unit 200 is made up of a band-limited image generation unit 201, a memory 204, middle and upper layer processing units 205, and a lower layer processing unit 217.

The band-limited image generation unit 201 is made up of reduction units 202 and 203. The middle and upper layer processing units 205 are made up of a luminance generation unit 206, a color conversion unit 207, a reduction unit 208, an enlargement unit 209, a subtraction unit 210, a luminance noise suppression unit 211, a color noise suppression unit 212, enlargement units 213 and 214, an addition unit 215, and a compositing unit 216. The lower layer processing unit 217 is made up of a luminance generation unit 206, a color conversion unit 207, a luminance noise suppression unit 211, and a color noise suppression unit 212.

Figure 3:
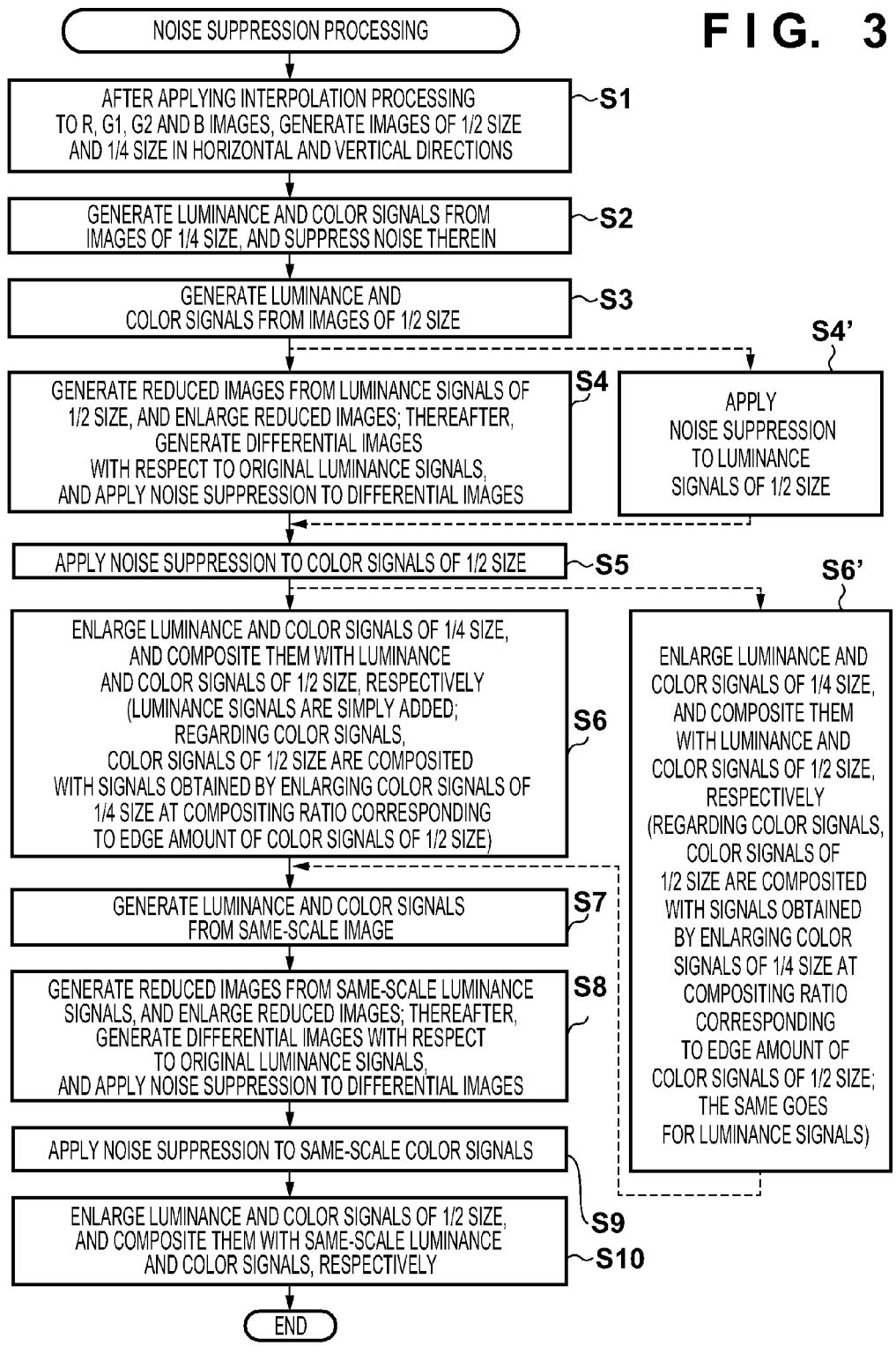
FIG. 3 is a flowchart for describing per-band noise suppression processing according to an embodiment of the present invention.

The following describes the operations of the noise suppression unit 200 with reference to a flowchart shown in FIG. 3. In the following description, it will be assumed that the image sensor 102 includes primary-color Bayer filters in which R, G1, G2 and B pixels are regularly arrayed, and noise suppression processing is to be applied to image signals to which the image processing circuit 105 has already applied white balance gain. While G1 pixels and G2 pixels are both green pixels, G1 pixels and G2 pixels are treated as different colors in per-color processing described below.

In step S1, the band-limited image generation unit 201 generates a plurality of images with different frequency bands. More specifically, in the present embodiment, the band-limited image generation unit 201 generates two types of images other than an input image. As described above, images with different frequency bands can be generated by generating images of different reduction ratios from the input image. It should be noted that, in the present description, the larger (higher) the "reduction ratio" is, the smaller a post-reduction image is compared to a pre-reduction image (original image). For example, the size of an image reduced at a reduction ratio of 80% in the horizontal and vertical directions is $1/25$ of the size of the original image ($1/5 \times 1/5$).

First, the band-limited image generation unit 201 outputs the input image as-is to the memory 204 as a same-scale image. The reduction unit 202 generates images by separating same-color pixels from the input image, applies pre-filtering to each image in the horizontal and vertical directions, reduces the images to ½ size in the horizontal and vertical directions, and outputs the four images of ½ size to the memory 204 and reduction unit 203. Furthermore, the reduction unit 203 applies pre-filtering to the four images of ½ size, reduces these four images to ½ size in the horizontal and vertical directions so as to generate images of ¼ size in four colors, and outputs the generated images of ¼ size to the memory 204. The reduced images are output to the memory 204 for the purpose of reducing the circuit scale in consideration of synchronization of time in each layer and the number of reference taps in each layer in the case where the present processing is realized using hardware.

In step S2, the lower layer processing unit 217 generates luminance signals and color signals from the images of ¼ size with the largest reduction ratio, and executes noise suppression processing. Luminance signals Y are generated by the luminance generation unit 206; for example, they can be calculated as follows.

$$Y = 0.3 \times R + 0.3 \times G1 + 0.3 \times G2 + 0.1 \times B \qquad \text{(Expression 1)}$$

Color signals U, V are generated by the color conversion unit 207; for example, they can be calculated as follows.

$$U = B - Y \qquad \text{(Expression 2)}$$

$$V = R - Y \qquad \text{(Expression 3)}$$

Next, the luminance noise suppression unit 211 suppresses noise in the luminance signals. For example, noise can be suppressed by averaging values of adjacent pixels that satisfy the condition that a difference between values thereof and a value of a target pixel is equal to or smaller than a predetermined value, and by performing a calculation to replace the value of the target pixel with the average value in sequence while changing the target pixel. Noise suppression processing can be applied also to the color signals by the color noise suppression unit 212 applying a similar calculation to the U and V signals.

In steps S3 to S6, the middle and upper layer processing unit 205 applies noise suppression processing to the images of ½ size.

In step S3, the luminance generation unit 206 and the color conversion unit 207 generate luminance signals and color signals. It is sufficient to generate these signals using (Expression 1) to (Expression 3).

In step S4, high-band components are extracted from the luminance signals, and noise is suppressed. First, similarly to the reduction unit 202, the reduction unit 208 applies pre-filtering to the images and then reduces the images to ½ size in the horizontal and vertical directions (=¼ size in the vertical and horizontal directions). Next, the enlargement unit 209 enlarges these images reduced to ½ size twofold in the horizontal and vertical directions (=½ size in the horizontal and vertical directions). It is sufficient to use, for example, bilinear enlargement processing as this enlargement processing. The subtraction unit 210 generates differential images by subtracting the enlarged images (½ size) from the input luminance signals (½ size). As the images generated by enlarging the reduced images are low-band images, the differential images contain high-band components. Then, the luminance noise suppression unit 211 applies noise suppression processing to the differential images.

With regard to images other than the reduced images with the largest reduction ratio (in the present case, images other than the images of ¼ size), noise suppression processing is applied after extracting the high-band components of the luminance signals, and therefore the luminance signals are separated in such a manner that bands do not overlap across different layers similarly to the case where the Laplacian pyramid is used. Therefore, the results of noise suppression processing are added for compositing.

In step S5, the color noise suppression unit 212 applies noise suppression processing to the color signals. With regard to noise suppression processing for the color signals, it is sufficient to apply processing similar to processing applied to the luminance signals to the U and V signals.

In step S6, compositing processing is executed using the images of ¼ size generated by the lower layer processing unit 217. The enlargement unit 213 enlarges the luminance signals input from the lower layer twofold in the horizontal and vertical directions; as a result, the input luminance signals have ½ size. The enlargement unit 214 similarly enlarges the color signals input from the lower layer. Furthermore, the addition unit 215 adds the differential luminance signals of ½ size and the enlarged luminance signals. In addition, to composite the color signals, the compositing unit 216 generates edge components from the color signals that are output from the color noise suppression unit 212 after the noise suppression, and calculates the ratio of the signals output from the color noise suppression unit 212 used for compositing (compositing ratio) for each pixel position.

Figure 4:
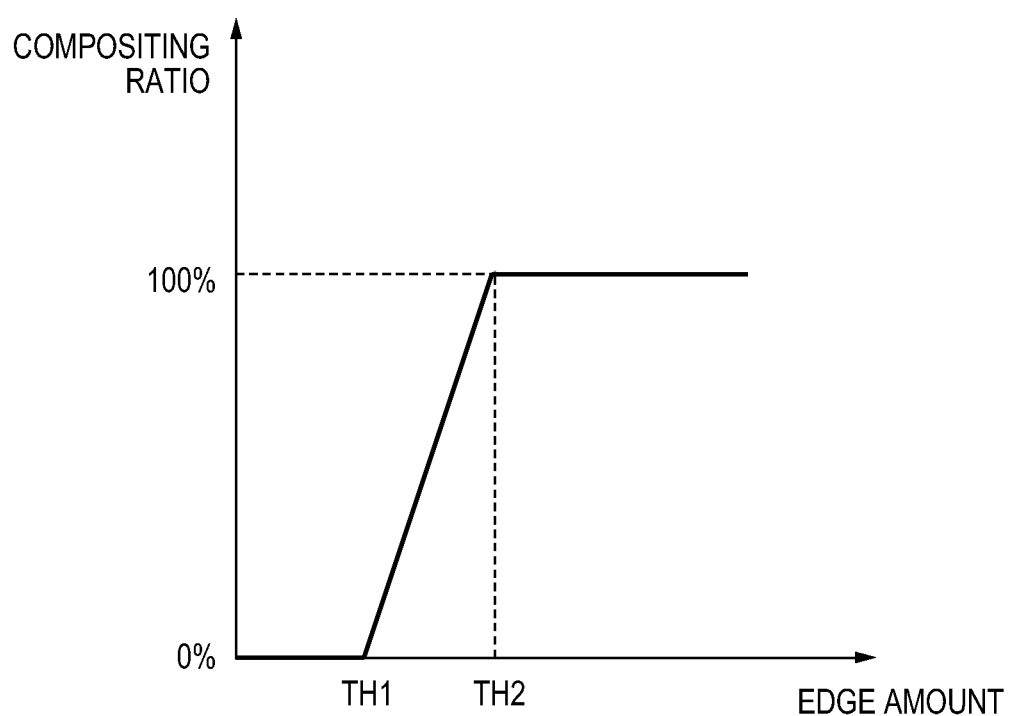
FIG. 4 shows an example of a relationship between an edge amount and a compositing ratio used by a compositing unit according to an embodiment of the present invention.

The compositing ratio can be calculated based on a relationship shown in FIG. 4 by using an edge amount, which is a value obtained by applying, for example, the following 3×3 spatial filter to the signals output from the color noise suppression unit 212 for each pixel position.

$$\begin{bmatrix} -1 & -1 & -1 \\ -1 & 8 & -1 \\ -1 & -1 & -1 \end{bmatrix}$$

As apparent from the relationship shown in FIG. 4, the larger the edge amount obtained from the signals output from the color noise suppression unit 212, the more the color signals of ½ size (with bands from which the edge amount is detected) are used; conversely, the smaller the edge amount, the more the signals obtained by enlarging the color signals of ¼ size (with lower bands) are used. Thresholds TH1 and TH2 shown in FIG. 4 can be determined by, for example, experiments.

As described above, with regard to the color signals, noise suppression processing is applied to each reduced image similarly to the case where the Gaussian pyramid is used, and therefore band separation is performed in such a manner that DC components overlap across different images. Then, by using the compositing ratio obtained based on edge signals extracted from the result of noise suppression processing applied to a certain reduced image, processing for compositing this result of noise suppression processing with the result of noise suppression processing applied to images reduced at the next reduction ratio smaller is repeated.

In steps S7 to S10, the middle and upper layer processing unit 205 applies noise suppression processing to the same-scale image. As the processes of these steps are almost similar to the processes of steps S3 to S6 with the alteration that the input image has a different size, the following describes only the differences between these processes.

More specifically, the differences pertain to processes executed by the luminance generation unit 206 and the color conversion unit 207. As the same-scale image is a Bayer image, it is separated into R, G1, G2 and B pixels, and then Y, U and V signals are generated for each color component.

As described above, according to the present embodiment, noise reduction processing is executed through multi-rate processing, in which image signals are separated into a plurality of frequency bands, noise suppression is performed for each frequency band, and then the frequency bands are recomposited. With regard to the luminance signals, recompositing is performed by adding the result of execution of noise suppression processing to high-band components extracted from each frequency band; that is to say, the bands make up the Laplacian pyramid, and compositing unevenness does not easily occur. On the other hand, with regard to the color signals, compositing is performed in sequence using the enlarged pixels in low-band images at a compositing ratio corresponding to an edge amount; that is to say, the bands make up the Gaussian pyramid. As sections with a small edge amount use a large number of images to which lower-band noise suppression has been applied, the effect of suppressing high-band color noise can be improved in particular. Furthermore, as the color signals are visually less prominent than the luminance signals, compositing unevenness in the color signals, which is caused by using a compositing ratio based on edge detection, has a small influence on the image quality. In addition, as there is no need to output both the Laplacian pyramid and the Gaussian pyramid to the memory, a memory amount can be reduced.

Second Embodiment

A description is now given of a second embodiment of the present invention. It is sufficient for an overall configuration of the present embodiment to be the same as that of the first embodiment, and therefore a description of common parts is omitted from the following description. The present embodiment differs from the first embodiment in a band dividing method used in noise suppression for luminance signals, that is to say, a configuration of noise suppression units.

Figure 5:
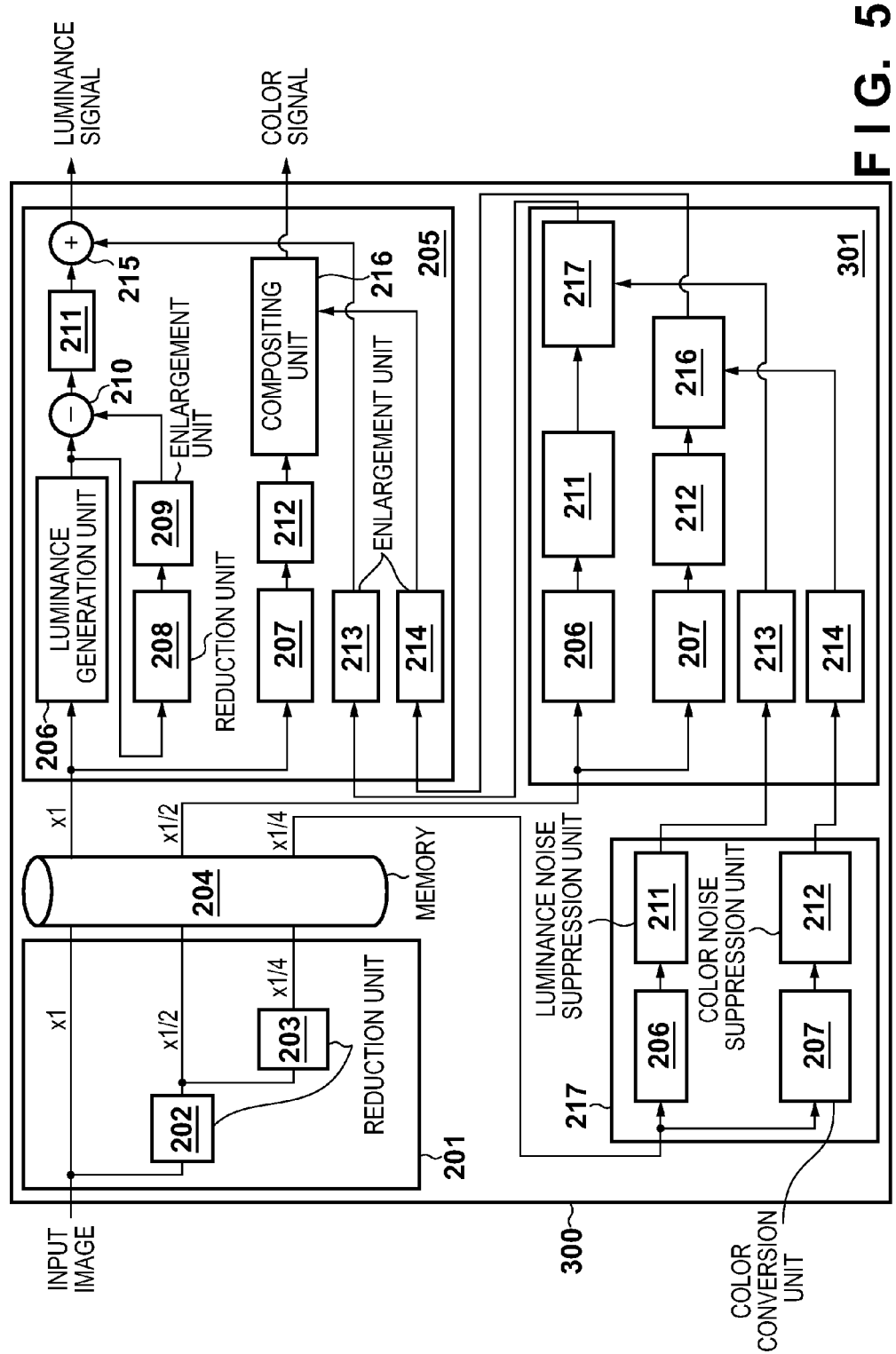
FIG. 5 is a block diagram showing an example of a configuration of an image processing circuit 105 according to a second embodiment of the present invention.
Figure 6A:
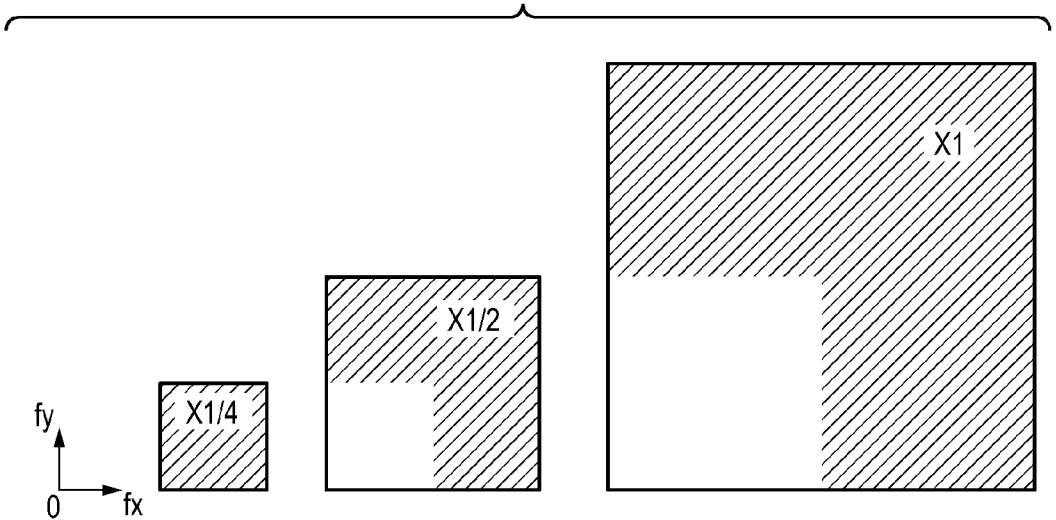
FIGS. 6A and 6B show images of bands in band-divided images.
Figure 6B:
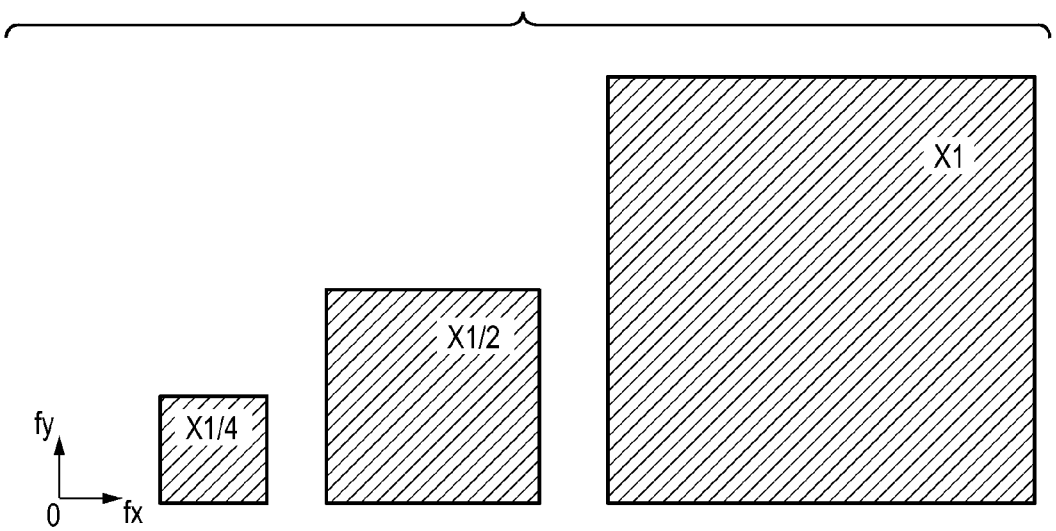

FIG. 5 is a block diagram showing an example of a functional configuration of a noise suppression unit 300 included in an image processing circuit 105 of a digital camera according to the present embodiment, and constituent elements that are the same as those shown in FIG. 2 are given the same reference signs thereas. In the first embodiment, noise suppression for band images other than the lowest-band images is performed using the middle and upper layer processing units 205 that are configured basically in the same manner. In contrast, the present embodiment instead uses a middle layer processing unit 301 that is configured to apply noise suppression to middle-band images in a manner different from a configuration for applying noise suppression to an input image.

The operations of the middle layer processing unit 301 differ from the operations of the middle and upper layer processing units 205 in that, in the flowchart shown in FIG. 3, steps S4' and S6' are executed in place of steps S4 and S6, respectively. That is to say, as opposed to the first embodiment in which noise suppression processing is applied to high-band components of luminance signals, a luminance noise suppression unit 211 applies noise suppression processing to luminance signals output from a luminance generation unit 206 without extracting high-band components in step S4' according to the present embodiment.

Furthermore, in step S6', a compositing unit 216 composites luminance signals of ½ size with signals obtained by enlarging luminance signals of ¼ size at a compositing ratio corresponding to an edge amount of the luminance signals of ½ size, similarly to color signals.

According to the configuration of the present embodiment, as luminance signals of images of ½ size are also composited with signals obtained by enlarging low-band luminance signals at a ratio corresponding to an edge amount, it is possible to store edges of images in addition to achieving the effect of the first embodiment.

Other Embodiments

To facilitate the description and understanding, the above embodiments have described multi-rate processing in which images are divided into three bands, i.e., low, middle and high bands. However, the number of divided bands is not limited to three, and may be any plural number.

For example, in the case where the number of divided bands m holds m≥4, there is no alteration in the first embodiment except that the number of the middle and upper layer processing units 205 in the noise suppression unit 200 of the image processing circuit 105 is m−1.

On the other hand, in the second embodiment, it is sufficient to adjust the number of the middle layer processing unit 301 and the middle and upper layer processing unit 205 in accordance with purposes, characteristics of images to be processed, and the like in executing noise suppression for layers other than the lowest layer (lowest band). For example, it is sufficient to use the middle and upper layer processing unit 205 for a predetermined number of layers (bands) starting from the highest layer (band), and the middle layer processing unit 301 for layers (bands) therebelow. This makes it possible to effectively suppress compositing unevenness for upper layers (bands) in which compositing unevenness is prominent, and to suppress noise for lower layers (bands) while giving priority to storage of edges; that is to say, more flexible noise suppression can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-275096, filed on Dec. 17, 2012, which is hereby incorporated by reference herein its entirety.

What is claimed is:

1. An image processing apparatus comprising:
a first division circuit that divides an input image into images composed of luminance signals of a plurality of bands that make up a Laplacian pyramid;
a plurality of luminance noise suppression circuits that each apply noise suppression to, out of the images divided by the first division circuit, an image composed of luminance signals of a corresponding band;
an addition circuit that adds images output from the plurality of luminance noise suppression circuits;
a second division circuit that divides the input image into images composed of color difference signals of a plurality of bands that make up a Gaussian pyramid;
a plurality of color noise suppression circuits that each apply noise suppression to, out of the images divided by the second division circuit, an image composed of color difference signals of a corresponding band; and
a compositing circuit that composites images output from the plurality of color noise suppression circuits at a ratio based on the images to be composited.

2. The image processing apparatus according to claim 1, wherein
the first division circuit includes a plurality of layer processing circuits corresponding to the plurality of bands,
each layer processing circuit includes:
a generation circuit that generates an image composed of luminance signals from an image obtained by reducing the input image at a predetermined reduction ratio;
a reduction circuit that reduces the image generated by the generation circuit;
an enlargement circuit that enlarges the image reduced by the reduction circuit; and
a subtraction circuit that subtracts the image enlarged by the enlargement circuit from the image generated by the generation circuit, and outputs a resultant image, and
the plurality of luminance noise suppression circuits apply noise suppression to the images output from the subtraction circuits.

3. The image processing apparatus according to claim 1, wherein
the first division circuit includes:
a predetermined number of first layer processing circuits that each generate an image composed of luminance signals, the first layer processing circuits corresponding in number to a group of top highest bands out of the plurality of bands; and
one or more second layer processing circuits that each generate an image composed of luminance signals, the second layer processing circuits corresponding to bands other than the group of top highest bands out of the plurality of bands,
the first layer processing circuits include:
a generation circuit that generates an image composed of luminance signals from an image obtained by reducing the input image at a predetermined reduction ratio;
a reduction circuit that reduces the image generated by the generation circuit;

an enlargement circuit that enlarges the image reduced by the reduction circuit; and a subtraction circuit that subtracts the image enlarged by the enlargement circuit from the image generated by the generation circuit, and outputs a resultant image, the second layer processing circuits include a generation circuit that generates an image composed of luminance signals from an image obtained by reducing the input image at a predetermined reduction ratio, and outputs the generated image, and the plurality of luminance noise suppression circuits apply noise suppression to the images output from the subtraction circuits in the first layer processing circuits and to the images output from the generation circuits in the second layer processing circuits.

4. The image processing apparatus according to claim 1, wherein the second division circuit generates the images composed of the color difference signals of the plurality of bands from a plurality of images obtained by reducing the input image at a plurality of reduction ratios.

5. The image processing apparatus according to claim 1, wherein the compositing circuit calculates the ratio from an edge amount in images composed of color difference signals output from the color noise suppression circuits.

6. An image processing apparatus comprising:

a processor; and a memory coupled to the processor, the memory having instructions that, when executed by the processor, perform operations comprising:

first division processing for dividing an input image into images composed of luminance signals of a plurality of bands that make up a Laplacian pyramid;

luminance noise suppression processing for applying noise suppression to each of the images divided in the first division processing;

addition processing for adding images to which the luminance noise suppression processing has been applied;

second division processing for dividing the input image into images composed of color difference signals of a plurality of bands that make up a Gaussian pyramid;

color noise suppression processing for applying noise suppression to each of the images divided in the second division processing; and compositing processing for compositing images to which the color noise suppression processing has been applied at a ratio based on the images.

7. An image processing method comprising:

(a) first dividing an input image into images composed of luminance signals of a plurality of bands that make up a Laplacian pyramid;

(b) applying noise suppression to each of the images divided in the first division step;

(c) adding images obtained in the luminance noise suppression step;

(d) second dividing the input image into images composed of color difference signals of a plurality of bands that make up a Gaussian pyramid;

(e) applying noise suppression to each of the images divided in the second dividing; and (f) composing images obtained in the applying at a ratio based on the images.

8. A non-transitory computer-readable recording medium having stored therein a program for causing a computer to execute an image processing method comprising:

(a) first dividing an input image into images composed of luminance signals of a plurality of bands that make up a Laplacian pyramid;

(b) applying noise suppression to each of the images divided in the first division step;

(c) adding images obtained in the luminance noise suppression step;

(d) second dividing the input image into images composed of color difference signals of a plurality of bands that make up a Gaussian pyramid;

(e) applying noise suppression to each of the images divided in the second dividing; and (f) composing images obtained in the applying at a ratio based on the images.

* * * * *